United States Patent
Hecht

(10) Patent No.: US 9,842,424 B2
(45) Date of Patent: Dec. 12, 2017

(54) VOLUME RENDERING USING ADAPTIVE BUCKETS

(71) Applicant: Pixar, Emeryville, CA (US)

(72) Inventor: Florian Hecht, Berkeley, CA (US)

(73) Assignee: Pixar, Emeryville, CA (US)

( * ) Notice: Subject to any disclaimer, the term of this patent is extended or adjusted under 35 U.S.C. 154(b) by 160 days.

(21) Appl. No.: 14/176,384

(22) Filed: Feb. 10, 2014

(65) Prior Publication Data

US 2015/0228110 A1   Aug. 13, 2015

(51) Int. Cl.
| G06T 15/08 | (2011.01) |
| G06T 1/60 | (2006.01) |
| G06T 15/00 | (2011.01) |
| G06T 15/06 | (2011.01) |
| G06T 15/50 | (2011.01) |

(52) U.S. Cl.
CPC ............. *G06T 15/08* (2013.01); *G06T 1/60* (2013.01); *G06T 15/005* (2013.01); *G06T 15/06* (2013.01); *G06T 15/50* (2013.01)

(58) Field of Classification Search
CPC ......... G06T 15/08; G06T 1/60; G06T 15/005; G06T 15/06; G06T 15/50; G06T 2200/04; G06T 11/60
See application file for complete search history.

(56) References Cited

U.S. PATENT DOCUMENTS 5,251,296 A * 10/1993 Rhoden .................. G06T 15/80
                                                345/531
5,351,082 A * 9/1994 Kasagi ................. H04N 3/1575
                                                348/294
5,488,700 A * 1/1996 Glassner ............... G06T 15/506
                                                345/426
5,566,282 A * 10/1996 Zuiderveld ............. G06T 15/08
                                                345/424
5,570,460 A * 10/1996 Ramanujam ............ G06T 17/20
                                                345/424
5,760,781 A * 6/1998 Kaufman .................. G06T 1/20
                                                345/424
5,793,326 A * 8/1998 Hofele .................. G01S 7/2927
                                                342/159
5,815,199 A * 9/1998 Palm ...................... H04N 5/217
                                                348/143

(Continued)

FOREIGN PATENT DOCUMENTS

JP      EP 0959428 A2 * 11/1999 ............... G06T 1/60

*Primary Examiner* — Devona E Faulk
*Assistant Examiner* — Charles L Beard
(74) *Attorney, Agent, or Firm* — Patterson + Sheridan, LLP

(57) ABSTRACT

Techniques are disclosed for rendering scene volumes having scene dependent memory requirements. A image plane used to view a three dimensional volume (3D) volume into smaller regions of pixels referred to as buckets. The number of pixels in each bucket may be determined based on an estimated number of samples needed to evaluate a pixel. Samples are computed for each pixels in a given bucket. Should the number of samples exceed the estimated maximum sample count, the bucket is subdivided into sub-buckets, each allocated the same amount of memory as was the original bucket. Dividing a bucket in half effectively doubles both the memory available for rendering the resulting sub-buckets and the maximum number of samples which can be collected for each pixel in the sub-bucket. The process of subdividing a bucket continues until all of the pixels in the original bucket are rendered.

28 Claims, 7 Drawing Sheets

(56) References Cited

U.S. PATENT DOCUMENTS

| | | | | |
|---|---|---|---|---|
| 5,852,446 A * | 12/1998 | Hashimoto | G06T 15/50 | 345/441 |
| 5,870,752 A * | 2/1999 | Gibbons | G06F 17/30368 | |
| 5,954,653 A * | 9/1999 | Hatfield | G01S 7/52034 | 128/916 |
| 5,977,987 A * | 11/1999 | Duluk, Jr. | G06T 15/10 | 345/441 |
| 6,028,608 A * | 2/2000 | Jenkins | G06T 1/0021 | 345/619 |
| 6,031,542 A * | 2/2000 | Wittig | G06T 15/00 | 345/426 |
| 6,057,847 A * | 5/2000 | Jenkins | G06T 15/40 | 345/422 |
| 6,072,497 A * | 6/2000 | Lichtenbelt | G06T 15/30 | 345/424 |
| 6,111,582 A * | 8/2000 | Jenkins | G06T 15/20 | 345/421 |
| 6,262,738 B1 * | 7/2001 | Gibson | G06T 15/06 | 345/419 |
| 6,278,460 B1 * | 8/2001 | Myers | G06T 7/0071 | 345/420 |
| 6,288,730 B1 * | 9/2001 | Duluk, Jr. | G06T 1/60 | 345/428 |
| 6,313,841 B1 * | 11/2001 | Ogata | G06T 15/10 | 345/424 |
| 6,407,746 B1 * | 6/2002 | Tanizawa | G06T 1/60 | 345/547 |
| 6,421,057 B1 * | 7/2002 | Lauer | G06T 15/005 | 345/424 |
| 6,424,346 B1 * | 7/2002 | Correll | G06T 15/005 | 345/424 |
| 6,429,864 B1 * | 8/2002 | Schwarzer | G06T 15/06 | 345/419 |
| 6,429,876 B1 * | 8/2002 | Morein | G06T 9/00 | 345/531 |
| 6,476,805 B1 * | 11/2002 | Shum | G06T 7/97 | 345/420 |
| 6,556,200 B1 * | 4/2003 | Pfister | G06T 15/55 | 345/426 |
| 6,559,843 B1 * | 5/2003 | Hsu | G06T 15/40 | 345/421 |
| 6,587,110 B1 * | 7/2003 | Kunimatsu | G06T 17/00 | 345/419 |
| 6,597,359 B1 * | 7/2003 | Lathrop | G06T 15/06 | 345/420 |
| 6,603,484 B1 * | 8/2003 | Frisken | G05B 19/4097 | 345/420 |
| 6,636,633 B2 * | 10/2003 | Guo | G06T 15/50 | 345/419 |
| 6,646,639 B1 * | 11/2003 | Greene | G06T 15/405 | 345/422 |
| 6,664,961 B2 * | 12/2003 | Ray | G06T 15/08 | 345/424 |
| 6,674,430 B1 * | 1/2004 | Kaufman | G06T 15/005 | 345/419 |
| 6,724,738 B1 * | 4/2004 | Storm | H04B 1/70752 | 370/320 |
| 6,760,024 B1 * | 7/2004 | Lokovic | G06T 15/06 | 345/421 |
| 6,774,943 B1 * | 8/2004 | Kao | H04N 5/208 | 348/252 |
| 6,785,411 B1 * | 8/2004 | Kitajima | G06T 7/60 | 382/133 |
| 6,828,977 B2 * | 12/2004 | Champion | G06T 1/60 | 345/531 |
| 6,909,436 B1 * | 6/2005 | Pianykh | G06T 11/008 | 345/581 |
| 6,999,078 B1 * | 2/2006 | Akerman | G06T 15/40 | 345/424 |
| 7,023,437 B1 * | 4/2006 | Voorhies | G06T 15/005 | 345/419 |
| 7,038,686 B1 * | 5/2006 | Lindholm | G06T 15/005 | 345/501 |
| 7,042,448 B2 * | 5/2006 | Kunimatsu | G06T 17/00 | 345/419 |
| 7,133,041 B2 * | 11/2006 | Kaufman | G06T 15/005 | 345/419 |
| 7,164,420 B2 * | 1/2007 | Ard | G06T 15/40 | 345/423 |
| 7,256,782 B2 * | 8/2007 | Aoyama | G06L 19/006 | 345/426 |
| 7,272,607 B2 * | 9/2007 | Udeshi | G06F 17/30961 | 707/769 |
| 7,301,538 B2 * | 11/2007 | Buyanovskiy | G06T 15/06 | 345/426 |
| 7,317,825 B2 * | 1/2008 | Yang | G06T 15/08 | 345/420 |
| 7,336,283 B2 * | 2/2008 | McCormack | G06F 12/0215 | 345/543 |
| 7,348,975 B2 * | 3/2008 | Reshetov | G06T 15/06 | 345/419 |
| 7,439,973 B2 * | 10/2008 | Fossum | G06T 15/06 | 345/422 |
| 7,495,664 B2 * | 2/2009 | Keller | G06T 15/06 | 345/426 |
| 7,499,053 B2 * | 3/2009 | Keller | G06T 15/06 | 345/426 |
| 7,567,205 B1 * | 7/2009 | Lee | G06T 15/06 | 342/169 |
| 7,567,248 B1 * | 7/2009 | Mark | G06T 11/40 | 345/426 |
| 7,719,539 B2 * | 5/2010 | Morphet | G06T 11/40 | 345/543 |
| 7,864,174 B2 * | 1/2011 | Shearer | G06T 15/06 | 345/421 |
| 7,952,583 B2 * | 5/2011 | Waechter | G06T 15/06 | 345/426 |
| 7,956,870 B2 * | 6/2011 | Snyder | G06T 15/04 | 345/423 |
| RE42,638 E * | 8/2011 | Ray | | 345/424 |
| 8,018,453 B2 * | 9/2011 | Fowler | G06T 13/20 | 345/419 |
| 8,040,350 B2 * | 10/2011 | Buyanovskiy | G06T 15/06 | 345/426 |
| 8,064,723 B2 * | 11/2011 | Tian | A61B 8/483 | 382/276 |
| 8,085,267 B2 * | 12/2011 | Brown | G06T 15/06 | 345/419 |
| 8,098,946 B2 * | 1/2012 | Kim | H04N 19/51 | 382/232 |
| 8,106,906 B1 * | 1/2012 | Duff | G06T 15/10 | 345/419 |
| 8,130,223 B1 * | 3/2012 | Danskin | G06T 1/60 | 345/422 |
| 8,149,238 B2 * | 4/2012 | Buyanovskiy | G06T 15/06 | 345/426 |
| 8,243,081 B2 * | 8/2012 | Shearer | G06T 15/06 | 345/502 |
| 8,244,018 B2 * | 8/2012 | McKenzie | G06T 15/06 | 348/77 |
| 8,253,730 B1 * | 8/2012 | Carr | G06T 15/06 | 345/419 |
| 8,259,105 B2 * | 9/2012 | Wald | G06T 15/06 | 345/419 |
| 8,285,023 B2 * | 10/2012 | Tsujii | G06T 15/08 | 382/131 |
| 8,379,955 B2 * | 2/2013 | McKenzie | G06T 15/06 | 348/77 |
| 8,384,711 B2 * | 2/2013 | Wald | G06T 15/06 | 345/419 |
| 8,436,856 B1 * | 5/2013 | Duff | G06T 15/005 | 345/423 |
| 8,441,477 B2 * | 5/2013 | Kho | G06T 15/06 | 345/419 |
| 8,493,383 B1 * | 7/2013 | Cook | G06T 15/06 | 345/419 |

(56) References Cited

U.S. PATENT DOCUMENTS

| | | | | |
|---|---|---|---|---|
| 8,553,041 B1* | 10/2013 | Danskin | G06T 15/005 | 345/530 |
| 8,619,078 B2* | 12/2013 | Mejdrich | G06T 15/06 | 345/419 |
| 8,654,135 B1* | 2/2014 | Danskin | G06T 1/60 | 345/530 |
| 8,692,825 B2* | 4/2014 | Mejdrich | G06T 15/06 | 345/419 |
| 8,717,357 B2* | 5/2014 | McCombe | G06T 15/06 | 345/419 |
| 8,817,026 B1* | 8/2014 | Zimmerman | G06T 1/60 | 345/426 |
| 8,842,117 B1* | 9/2014 | Zimmerman | G06T 1/60 | 345/419 |
| 8,872,826 B2* | 10/2014 | Kulla | G06T 15/06 | 345/426 |
| 8,928,675 B1* | 1/2015 | Zimmerman | G06T 1/60 | 345/501 |
| 8,947,447 B1* | 2/2015 | Zimmerman | G06T 1/60 | 345/564 |
| 8,952,963 B1* | 2/2015 | Zimmerman | G06T 1/60 | 345/419 |
| 8,963,920 B2* | 2/2015 | Park | G06T 15/06 | 345/419 |
| 8,970,592 B1* | 3/2015 | Petterson | G06T 13/60 | 345/419 |
| 9,035,945 B1* | 5/2015 | McKenzie | G06T 15/06 | 345/424 |
| 9,035,946 B1* | 5/2015 | Zimmerman | G06T 1/60 | 345/426 |
| 9,053,574 B2* | 6/2015 | Ernvik | | |
| 9,058,691 B1* | 6/2015 | Zimmerman | G06T 1/60 | |
| 9,082,217 B1* | 7/2015 | McKenzie | G06T 15/06 | |
| 9,087,394 B1* | 7/2015 | Zimmerman | G06T 1/60 | |
| 9,092,888 B1* | 7/2015 | Gardiner | G06T 17/00 | |
| 9,111,385 B2* | 8/2015 | Kho | G06T 15/08 | |
| 9,189,883 B1* | 11/2015 | Hecht | G06T 15/08 | |
| 9,237,849 B1* | 1/2016 | McKenzie | A61B 5/0033 | |
| 9,245,363 B2* | 1/2016 | Laine | G06T 11/40 | |
| 9,305,394 B2* | 4/2016 | Wachter | G06T 15/50 | |
| 9,342,920 B1* | 5/2016 | McKenzie | G06T 15/08 | |
| 9,433,398 B2* | 9/2016 | Owen | A61B 8/4427 | |
| 9,581,964 B2* | 2/2017 | Gioia | G03H 1/22 | |
| 9,613,598 B2* | 4/2017 | Morphet | G09G 5/39 | |
| 2002/0005850 A1* | 1/2002 | Osborne | G06T 15/005 | 345/424 |
| 2002/0094125 A1* | 7/2002 | Guo | G06L 15/50 | 382/199 |
| 2002/0113787 A1* | 8/2002 | Ray | G06T 15/08 | 345/424 |
| 2002/0118206 A1* | 8/2002 | Knittel | G06F 12/0875 | 345/557 |
| 2003/0025695 A1* | 2/2003 | Morphet | G06T 15/40 | 345/423 |
| 2003/0164961 A1* | 9/2003 | Daly | G06T 5/001 | 358/1.9 |
| 2004/0001069 A1* | 1/2004 | Snyder | G06T 15/80 | 345/582 |
| 2004/0125103 A1* | 7/2004 | Kaufman | G06T 15/005 | 345/419 |
| 2004/0150583 A1* | 8/2004 | Fukushima | H04N 13/0409 | 345/6 |
| 2004/0263511 A1* | 12/2004 | West | G06T 15/40 | 345/421 |
| 2005/0015538 A1* | 1/2005 | Van't Wout | G06F 12/0207 | 711/5 |
| 2005/0017971 A1* | 1/2005 | Ard | G06T 15/40 | 345/423 |
| 2005/0088714 A1* | 4/2005 | Kremen | G02B 5/1885 | 359/28 |
| 2005/0264578 A1* | 12/2005 | Engel | G06T 15/08 | 345/582 |
| 2005/0286748 A1* | 12/2005 | Yang | G06T 15/08 | 382/128 |
| 2006/0056726 A1* | 3/2006 | Fujiwara | G06T 15/08 | 382/276 |
| 2006/0071932 A1* | 4/2006 | Weese | G06T 15/08 | 345/424 |
| 2006/0112115 A1* | 5/2006 | Chan | G06F 17/30017 | |
| 2006/0147106 A1* | 7/2006 | Yang | G06T 15/08 | 382/154 |
| 2006/0152510 A1* | 7/2006 | Dick | G06T 15/08 | 345/440 |
| 2006/0170682 A1* | 8/2006 | Van Liere | G06T 1/60 | 345/427 |
| 2006/0176302 A1* | 8/2006 | Hayes | G06T 15/06 | 345/426 |
| 2006/0181551 A1* | 8/2006 | Matsumoto | G06T 15/08 | 345/679 |
| 2006/0274065 A1* | 12/2006 | Buyanovskiy | G06T 15/06 | 345/424 |
| 2007/0002066 A1* | 1/2007 | Whitted | G06T 15/005 | 345/582 |
| 2007/0002068 A1* | 1/2007 | Whitted | G06T 15/005 | 345/582 |
| 2007/0024639 A1* | 2/2007 | Hastings | G06T 11/203 | 345/613 |
| 2007/0040833 A1* | 2/2007 | Buyanovski | G06T 15/06 | 345/426 |
| 2007/0053553 A1* | 3/2007 | Gerritsen | G06T 15/08 | 382/128 |
| 2007/0098299 A1* | 5/2007 | Matsumoto | G06T 15/08 | 382/284 |
| 2007/0104379 A1* | 5/2007 | Kim | H04N 19/51 | 382/238 |
| 2007/0168621 A1* | 7/2007 | Taneja | G06T 1/60 | 711/147 |
| 2007/0257935 A1* | 11/2007 | Koduri | G06F 3/14 | 345/611 |
| 2007/0262989 A1* | 11/2007 | Buyanovskiy | G06T 15/06 | 345/426 |
| 2008/0018746 A1* | 1/2008 | Kawanami | H04N 1/2112 | 348/207.99 |
| 2008/0024493 A1* | 1/2008 | Bordoloi | G06T 15/08 | 345/423 |
| 2008/0030500 A1* | 2/2008 | Krishnan | G06T 15/08 | 345/424 |
| 2008/0043018 A1* | 2/2008 | Keller | G06T 15/06 | 345/426 |
| 2008/0091388 A1* | 4/2008 | Failla | A61N 5/1031 | 703/2 |
| 2008/0238920 A1* | 10/2008 | Brown | G06T 15/06 | 345/426 |
| 2008/0252641 A1* | 10/2008 | Masumoto | A61B 6/08 | 345/424 |
| 2008/0259075 A1* | 10/2008 | Fowler | G06T 15/06 | 345/421 |
| 2008/0259080 A1* | 10/2008 | Masumoto | G06T 15/08 | 345/426 |
| 2008/0262353 A1* | 10/2008 | Tian | A61B 8/483 | 600/443 |
| 2008/0262355 A1* | 10/2008 | Yao | A61B 8/08 | 600/445 |
| 2008/0317321 A1* | 12/2008 | Zhang | G06L 15/08 | 382/132 |
| 2009/0016641 A1* | 1/2009 | Paladini | G06T 15/08 | 382/278 |
| 2009/0033653 A1* | 2/2009 | Brown | G06T 15/06 | 345/419 |
| 2009/0040220 A1* | 2/2009 | Gibbs | G06T 13/60 | 345/424 |
| 2009/0060309 A1* | 3/2009 | Tsujii | G06T 15/08 | 382/131 |
| 2009/0096787 A1* | 4/2009 | Masumoto | G06T 7/0012 | 345/424 |
| 2009/0096789 A1* | 4/2009 | Peterson | G06T 15/06 | 345/426 |

(56) References Cited

U.S. PATENT DOCUMENTS

| | | | |
|---|---|---|---|
| 2009/0141026 A1* | 6/2009 | Raab | G06T 11/001 345/424 |
| 2009/0153556 A1* | 6/2009 | Nam | G06T 15/06 345/421 |
| 2009/0167763 A1* | 7/2009 | Waechter | G06T 15/06 345/426 |
| 2009/0213144 A1* | 8/2009 | Dokken | G06L 15/06 345/660 |
| 2009/0262132 A1* | 10/2009 | Peterson | G06T 15/06 345/619 |
| 2009/0295800 A1* | 12/2009 | Vetter | G06T 15/08 345/424 |
| 2010/0085360 A1* | 4/2010 | Ren | G06T 15/50 345/426 |
| 2010/0164948 A1* | 7/2010 | Kho | G06T 15/06 345/419 |
| 2010/0188396 A1* | 7/2010 | Mejdrich | G06T 17/005 345/419 |
| 2010/0188403 A1* | 7/2010 | Mejdrich | G06T 17/005 345/426 |
| 2010/0194751 A1* | 8/2010 | Wald | G06T 15/06 345/426 |
| 2010/0207944 A1* | 8/2010 | Novosad | G06T 15/50 345/426 |
| 2010/0309205 A1* | 12/2010 | Novosad | G06T 15/06 345/426 |
| 2011/0043521 A1* | 2/2011 | Smyth | G06T 15/06 345/424 |
| 2011/0069070 A1* | 3/2011 | Engel | G06T 15/08 345/426 |
| 2011/0080403 A1* | 4/2011 | Ernst | G06T 15/06 345/420 |
| 2011/0115785 A1* | 5/2011 | Miyamoto | A61B 6/466 345/419 |
| 2011/0148919 A1* | 6/2011 | Heggelund | G06T 15/005 345/629 |
| 2011/0169830 A1* | 7/2011 | D'Amora | G06T 15/06 345/424 |
| 2011/0228055 A1* | 9/2011 | Sharp | G06T 15/06 348/51 |
| 2011/0285710 A1* | 11/2011 | Mejdrich | G06T 15/06 345/426 |
| 2011/0316855 A1* | 12/2011 | Mejdrich | G06T 15/06 345/420 |
| 2012/0075287 A1* | 3/2012 | Park | G06T 15/06 345/419 |
| 2012/0098937 A1* | 4/2012 | Sajadi | G03B 21/14 348/46 |
| 2012/0133654 A1* | 5/2012 | Redgrave | G06T 15/005 345/419 |
| 2012/0133656 A1* | 5/2012 | McKenzie | G06T 15/06 345/424 |
| 2012/0212496 A1* | 8/2012 | Kulla | G06T 15/506 345/501 |
| 2012/0249742 A1* | 10/2012 | Abert | G06T 15/06 348/46 |
| 2012/0328012 A1* | 12/2012 | Sasai | H04N 19/159 375/240.12 |
| 2013/0016782 A1* | 1/2013 | Sasai | H04N 19/197 375/240.13 |
| 2013/0027417 A1* | 1/2013 | Merrell | G06T 15/06 345/582 |
| 2013/0039422 A1* | 2/2013 | Kirchhoffer | H04N 19/52 375/240.13 |
| 2013/0112407 A1* | 5/2013 | Cheng | G01V 11/00 166/250.15 |
| 2013/0120385 A1* | 5/2013 | Krishnaswamy | G06T 15/50 345/426 |
| 2013/0135306 A1* | 5/2013 | Engel | G06T 15/08 345/423 |
| 2013/0271464 A1* | 10/2013 | Engel | G06T 15/06 345/426 |
| 2013/0293544 A1* | 11/2013 | Schreyer | G06T 15/005 345/426 |
| 2013/0314417 A1* | 11/2013 | Buyanovskiy | G06T 15/06 345/426 |
| 2013/0328884 A1* | 12/2013 | Su | G06T 11/20 345/441 |
| 2014/0031967 A1* | 1/2014 | Unger | B29C 67/0088 700/119 |
| 2014/0098098 A1* | 4/2014 | Chauvier | G06T 15/50 345/426 |
| 2014/0146049 A1* | 5/2014 | Ozdas | G06T 15/06 345/426 |
| 2014/0176545 A1* | 6/2014 | Laine | G06T 17/00 345/424 |
| 2014/0176574 A1* | 6/2014 | Bakalash | G06F 12/0875 345/505 |
| 2014/0235923 A1* | 8/2014 | McNutt | A61N 5/1031 600/1 |
| 2014/0240316 A1* | 8/2014 | Engle | G06T 15/06 345/426 |
| 2014/0310496 A1* | 10/2014 | Eguro | H04N 5/33 711/168 |
| 2014/0354661 A1* | 12/2014 | Balci | G06T 15/005 345/522 |
| 2014/0375640 A1* | 12/2014 | Bakalash | G06T 15/06 345/426 |
| 2014/0375641 A1* | 12/2014 | Bakalash | G06F 9/5061 345/426 |
| 2014/0375643 A1* | 12/2014 | Bakalash | G06T 15/06 345/426 |
| 2014/0375644 A1* | 12/2014 | Bakalash | G06T 15/06 345/426 |
| 2015/0022523 A1* | 1/2015 | Murray | G06T 15/08 345/426 |
| 2015/0029185 A1* | 1/2015 | Ikits | G06T 15/08 345/420 |
| 2015/0042658 A1* | 2/2015 | Erhard | G06T 19/00 345/427 |
| 2015/0088301 A1* | 3/2015 | Erdim | G05B 19/18 700/190 |
| 2015/0123971 A1* | 5/2015 | Lee | G06T 15/06 345/426 |
| 2015/0187117 A1* | 7/2015 | Balci | G06T 1/20 345/522 |
| 2015/0228049 A1* | 8/2015 | Yang | G06T 1/20 345/501 |
| 2015/0228051 A1* | 8/2015 | Zimmerman | G06T 1/60 345/559 |
| 2015/0228107 A1* | 8/2015 | Zimmerman | G06T 1/60 345/419 |
| 2015/0228108 A1* | 8/2015 | Zimmerman | G06T 1/60 345/426 |
| 2015/0228109 A1* | 8/2015 | Zimmerman | G06T 1/60 345/419 |
| 2015/0262416 A1* | 9/2015 | Hecht | G06T 15/08 345/424 |
| 2015/0301623 A1* | 10/2015 | Wang | G06F 3/0317 345/157 |
| 2015/0325033 A1* | 11/2015 | Bakalash | G06F 12/0875 345/503 |
| 2015/0348307 A1* | 12/2015 | Lee | G06T 15/06 345/426 |
| 2015/0348314 A1* | 12/2015 | Koguchi | G06T 15/506 345/420 |
| 2016/0000409 A1* | 1/2016 | Bruder | A61N 5/1049 600/427 |
| 2016/0019672 A1* | 1/2016 | Bakalash | G06T 1/20 345/505 |
| 2016/0033642 A1* | 2/2016 | Fluckiger | G01S 17/026 356/5.01 |
| 2017/0091987 A1* | 3/2017 | Morphet | G06T 15/005 |

* cited by examiner

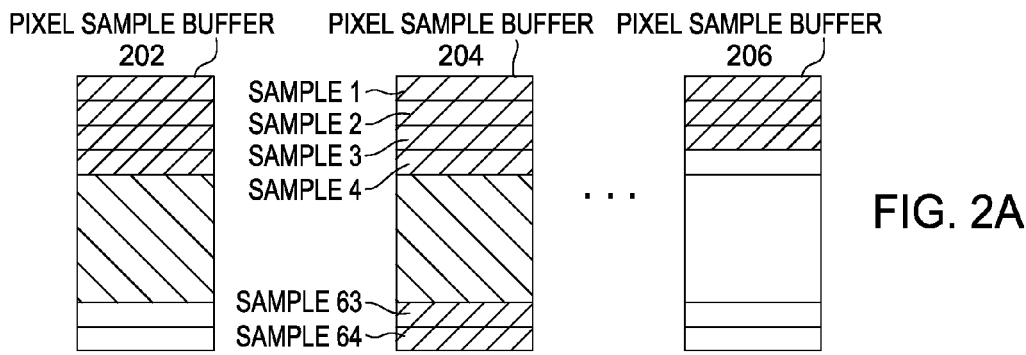
FIG. 2A
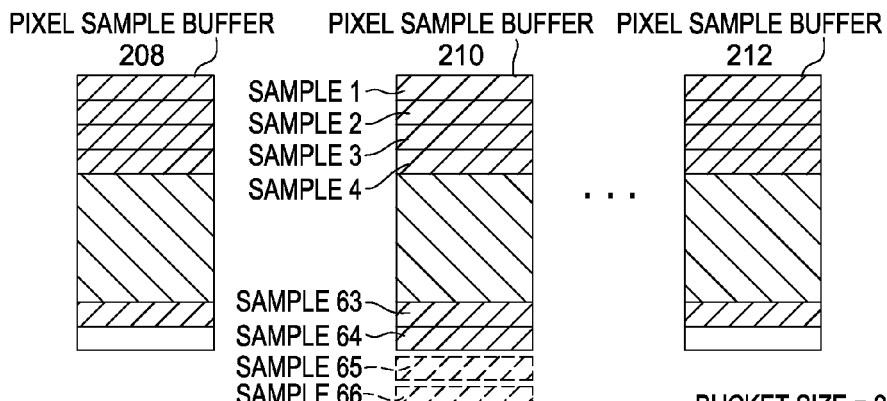
FIG. 2B
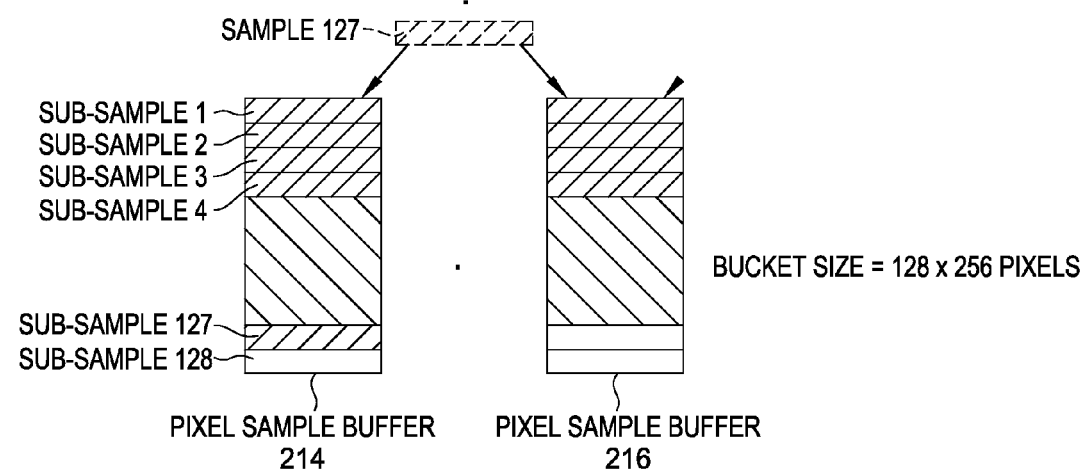

VOLUME RENDERING USING ADAPTIVE BUCKETS

BACKGROUND

Field of the Invention

Embodiments presented herein generally relate to rendering images of three-dimensional (3D) volume and, more specifically to rendering 3D volumes using adaptive buckets.

Description of the Related Art

Graphic Processing Units (GPUs) are widely used for rendering volumes representing scenes. A volume contains elements that make up a three dimensional scene which may be rendered to produce an image for display such as a computer display, cinematic film, video, etc. GPU hardware executes rendering programs or subprograms, in parallel, which produces the output image(s) in substantially shorter time than a nonparallel computing system.

However, a GPU does not dynamically allocate memory. Dynamic memory allocation is a feature in modern programming languages that provides a mechanism to request a portion of available memory when it is required and to release memory when it is no longer required. Doing so allows programs to process data that has varying memory requirements more efficiently.

One drawback of a lack of dynamic memory allocation in GPUs is that in some instances the rendering of a volume may fail. For example, if an insufficient amount of memory has been allocated to the GPU, individual rendering processes may exceed their allocated memory and artifacts will result. In this case the rendering must be restarted with either more memory allocated to the GPU, a reduction in the number of pixels processed by the GPU, or both. This problem can be exacerbated if the failure occurs at the very end of the volume processing; requiring a complete re-rendering of the entire volume.

SUMMARY

One embodiment presented herein includes a method for rendering an image of a three-dimensional (3D) volume. This method may generally include dividing pixels of an image plane into a set of buckets to be rendered. Each bucket corresponds to a two-dimensional (2D) array of pixels. And each bucket includes rendering samples for pixels in the 2D array corresponding to the bucket. This method may also include determining, for each of one or more pixels of each 2D array, a sample count value specifying a maximum number of rendering samples to be included in the bucket corresponding to the 2D array and processing the set of buckets to generate an image of a 3D volume. Processing the set of buckets may generally include selecting a bucket from the set of buckets, generating a plurality of rendering samples used to determine a pixel value for each pixel in the 2D array corresponding to the selected bucket, and including, for each pixel, in the selected bucket, the generated plurality of rendering samples, up to the maximum number of rendering samples. The processing may further include, upon determining rendering samples generated for at least one pixel in the 2D array corresponding to the selected bucket exceeds the sample count value specifying the maximum number of rendering samples, the selected bucket is subdivided into at least two sub-buckets, which may be added to the set of buckets for processing.

Another embodiment includes a method for rendering at least a portion of an image of a three dimensional (3D) volume. This method may generally include, for each pixel in the portion of the image, generating one or more samples of the 3D volume used to determine pixel values for the pixel and storing, up to a per-pixel maximum, the samples generated for the pixel in a memory array. This method may further include upon determining a maximum count of samples generated for any of the pixels in the portion of the image exceeds the per-pixel maximum, repeatedly subdividing the portion of the image into at least two portions until the memory array can store the maximum count of samples for pixels in the subdivided portion of the image.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 2A and 2B illustrate a set of bucket memory arrays before and after an adaptive reallocation process, according to one embodiment.

DETAILED DESCRIPTION

Figure 1A:
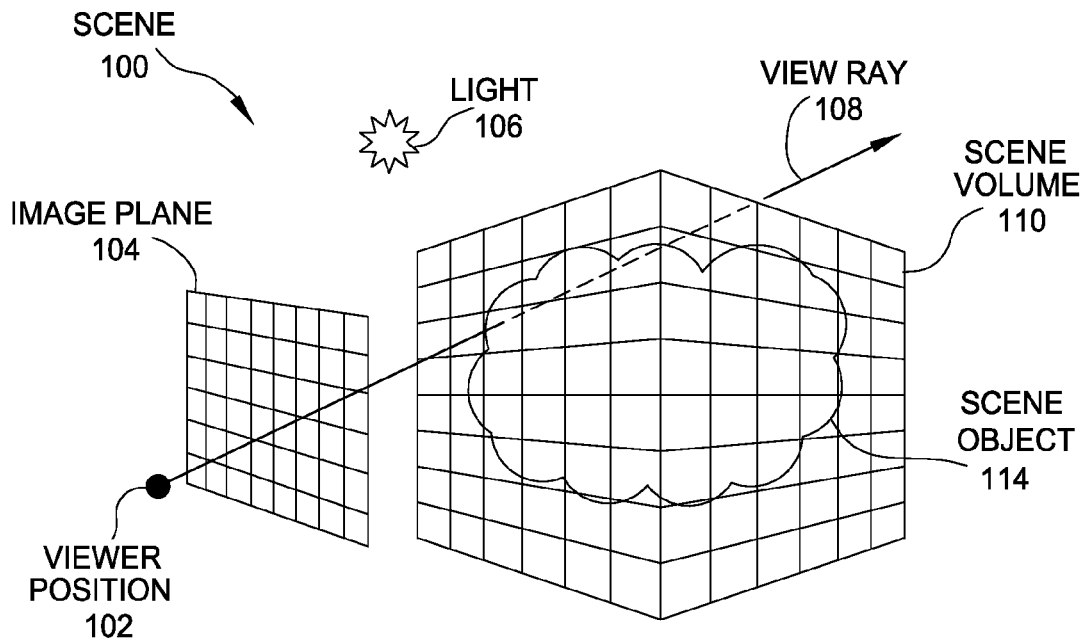
FIGS. 1A and 1B illustrate an example of volume ray tracing through a scene during image rendering, according to one embodiment.

Embodiments presented herein provide techniques for efficiently rendering scene volumes having scene dependent memory requirements. A typical scene volume often includes components such as illumination sources and objects. In some instances, to render the scene volume, a ray having an origin at a viewer's position is traced through a point on an image plane corresponding to a display pixel (also referred to herein as a "pixel") and into the scene volume. As the ray is traced through the scene volume, samples related to the objects and illumination sources within the scene volume are computed for specific points along the ray. The collected samples are then used to generate intensity and/or color values for the corresponding display pixel.

In one embodiment, the pixels corresponding to an image plane are divided into smaller regions of pixels referred to as "buckets." The number of pixels in each bucket may be determined based on the total amount of memory available to the GPU and the estimated maximum number of samples needed to evaluate each pixel in the bucket. For example, one hundred megabytes of memory may be available to a GPU. It may be estimated that each pixel will require a maximum of 64 samples. As a result, it may be determined that each bucket should be a size equal to 256×256 pixels.

In one aspect, each bucket is rendered in order to generate a final rendering of a scene volume. To render an individual bucket, samples are computed at specific points along a ray during ray tracing of each pixel in the bucket. A sample may include any suitable information, including the location or depth of the sample, material properties at the sample location, illumination at the location, or other information. For example, the samples for a particular pixel may include density values for the pixel at several different sample locations. The density values may be used to determine the pixel intensity for a pixel. In one aspect, samples may be generated for a pixel until either the maximum predicted number of samples is reached, or the ray exits the volume.

In one embodiment, should the number of samples exceed the estimated maximum number of samples needed to evaluate each pixel, any additional samples are not saved as continuing to save the additional samples runs the risk of overwriting the memory allocated to neighboring pixels. However, the total number of samples required to render the pixel, inclusive of any additional samples, (also referred to as the "sample count") is recorded. Thereafter, the sample count for each of the pixels in the bucket is checked against the estimated maximum number of samples (also referred to as the "maximum sample count"). If none of the sample counts exceeds the estimated maximum sample count, the pixels in the bucket are determined to have been rendered successfully, and the rendering for a subsequent bucket is performed. However, if a sample count for any pixel exceeds the estimated maximum sample count, the bucket is subdivided into a pair of sub-buckets and the sub-buckets are then re-rendered.

In one embodiment, a bucket is divided in half along a selected axis, either the X axis or the Y axis, of the pixels corresponding to the bucket. Should the bucket require further subdivision, the selection of the axis is alternated for each subdivision to prevent narrow "strips". In re-rendering a sub-bucket, the amount of memory used for the re-rendering may be equal to the original amount of memory allocated to entirety of the corresponding bucket. The sample count for each pixel in the sub-bucket is checked during the re-rendering and if any sample count exceeds the estimated maximum sample count for the sub-bucket, the sub-bucket is subdivided once again and re-rendered. The process of subdividing a bucket continues until all of the pixels in the original bucket are rendered. If other buckets have unsaved samples, such buckets are subdivided and rendered in a comparable manner. Dividing a bucket in half effectively doubles both the memory available for rendering the resulting sub-buckets and the maximum number of samples which can be collected for each pixel in the sub-bucket.

The approach described herein is more efficient because it allows for faster rendering of large areas of a scene where the expected number of samples is sufficient to render each pixel in a bucket. Only buckets covering complex geometry or lighting are subdivided. Further, re-rendering a subdivided bucket avoids re-rendering the entire image using new estimates of the necessary memory, over allocating memory, or using smaller, less efficient buckets. Once a bucket has been successfully rendered, the subdivision scheme used during the rendering of the bucket can be saved. The subdivision schemes for the buckets in an image can be reused during an interactive process of rendering and re-rendering the image during the image development process.

Figure 1B:
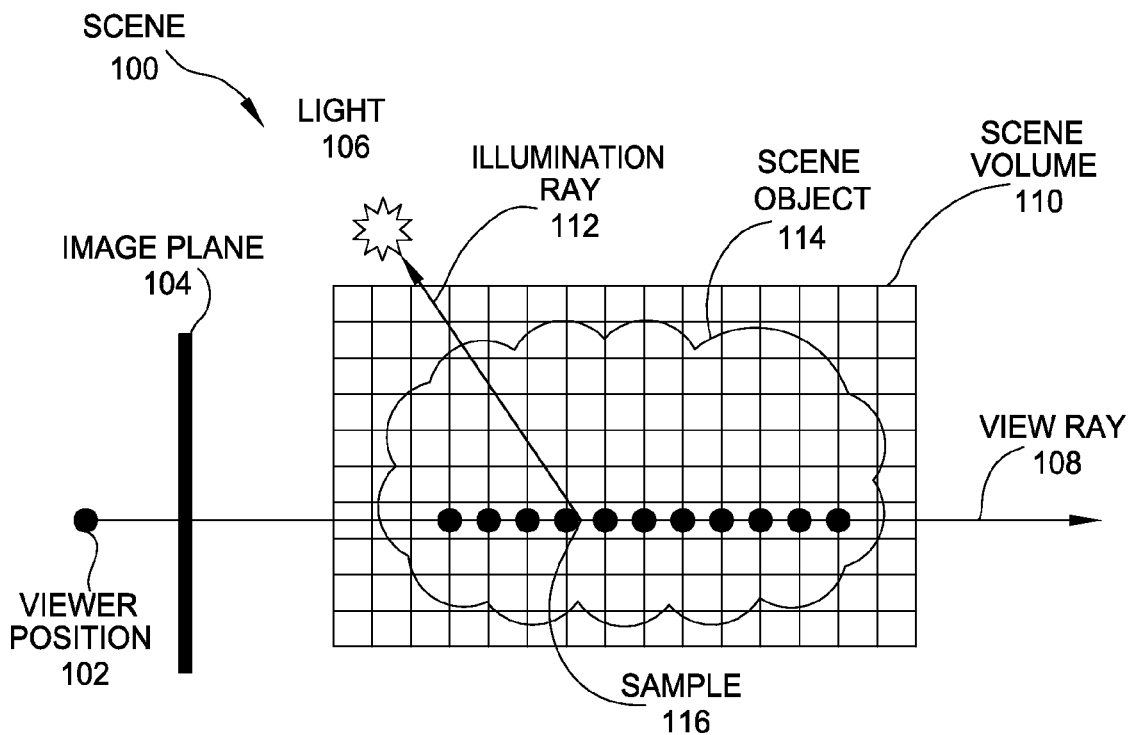

FIGS. 1A and 1B illustrate an example of volume ray tracing through a scene during image rendering, according to one embodiment. As shown in FIG. 1A, scene 100 includes viewer position 102, image plane 104, light source 106, view ray 108, scene volume 110 and scene object 114. Viewer position 102 defines a spatial location in scene 100 of a viewer's eyes or camera used to view an image of a 3D volume. Image plane 104, represents the image output display. Image plane 104 is positioned between viewer position 100 and scene volume 110. Image plane 104 is divided into picture elements (pixels). Light source 106 represents illumination data for the scene 100 as well as a source of the illumination data for the sample computations. Examples of light source 106 include point light sources, spotlights, directional lights, area light sources, images, volumetric lights, etc. View ray 108 originates at view position 102, passes through a pixel position in image plane 104 and through scene volume 110. Scene object 114 is present in scene volume 110 such that scene object 114 is divided into discrete volume elements, or voxels, along with scene volume 110. View ray 108 is shown passing through scene object 114.

FIG. 1B illustrates a sampling process which occurs during ray tracing through scene volume 110. Once view ray 108 is defined, the rendering process traces view ray 108 through scene volume 110. During volume rendering samples may be computed for each pixel at defined points along view ray 108. Each sample specifies an opacity associated with the pixel at a given depth. Depending on the underlying features of the render process, representative sample 116 may be computed at the intersection of view ray 108 with the boundary of a voxel (highlighted by the gray circles), at the voxel center, or based on a stochastic model. If a sampling point is located between voxels a value of the sample may be interpolated from the surrounding voxels, e.g. trilinear interpolation. To render a 3D volume, a phase function or scattering distribution function may be used. For example, well known phase functions include isotropic scattering, a Henyey-Greenstein function or Mie scattering. As another example, a bidirectional reflectance distribution function (BRDF), or variation thereof, may be used. In addition, any kind of information of the illumination in the scene can be used during the sampling process. The diagram of illumination ray 112 shows one method for collecting illumination data for a sample 116. Sample 116 is the origin for illumination ray 112 with light source 106 providing the direction for illumination ray 112. Illumination ray 112 is sampled in the same manner as view ray 108 between sample 116 and light 106. The samples are used to determine a contribution of intervening scene volume 110 and scene object 114 voxels on the illumination of sample 116.

Adaptive Bucket Subdivision

FIGS. 2A and 2B illustrate a set of bucket memory arrays before and after an adaptive reallocation process, according to one embodiment. FIG. 2A includes pixel sample buffers 202, 204, and 206. The sample memory locations in the memory array allocated to each pixel bucket are labeled "Sample 1", "Sample 2", etc. accordingly. Array locations that contain sample data are shaded. FIG. 2A illustrates a situation where the estimated number of samples for the pixels in the bucket was sufficient. The number of pixels in each bucket is based on the total amount of memory available in the GPUs system and an estimate of the number of samples needed to evaluate each pixel in the bucket. In FIG. 2A, the available memory in the GPUs system supported a bucket size of 256×256 pixels with an estimate of the maximum number of samples for each pixel in the bucket as 64 samples. Note, for simplicity, pixels are described below as being associated with a single camera ray. However, embodiments may be implemented where several rays are fired per pixel as well as where a single ray might contribute to several output pixels. The term pixel sample buffer is used to broadly refer to volume rendering samples collected using any of these variations.

In FIG. 2A, pixel sample buffer 202 represents the first pixel in the bucket and stores 4 samples. Pixel sample buffer 206 is associated with the last pixel in the bucket, or pixel number 65,536, and pixel sample buffer 206 stores 63 samples. Pixel sample buffer 204 contains 64 samples, which does not exceed the predicted maximum number of samples required for a ray.

In one embodiment, a rendering component compares the sample count values to the estimated maximum sample count to determine if any sample count values exceeded the estimated maximum sample count. In the example of FIG. 2A, none of the examples exceeds the predicted 64-sample maximum, so no further sub-dividing is required. The rendering process completes for this bucket and moves to the next bucket. Additionally, the final subdivision scheme for a particular bucket (i.e., a scheme of any bucket subdivisions that can be reused to render that same bucket, e.g., using different lighting parameters or object properties) is saved for interactive development of images.

FIG. 2B shows the memory allocated to a bucket based on a bucket size of 256×256 pixels and memory for 64 samples for each pixel. In FIG. 2B, pixel sample buffer 208 corresponds to the first pixel in the bucket, pixel sample buffer 210 corresponds to a pixel sample buffer between pixel sample buffer 208 and pixel sample buffer 212 corresponds to the last pixel in the bucket. As in FIG. 2A, sample memory locations are indicated by the inset boxes and labeled "Sample 1", "Sample 2", etc. accordingly. Similarly, each pixel sample buffer is associated with an independent view ray and the samples for a particular view ray are saved in the associated pixel sample buffer memory locations. Memory locations that contain the sample data are shown as shaded boxes. Both pixel sample buffer 208 and pixel sample buffer 212 are shown with 63 samples which fit in the available memory. However, the view ray associated with pixel sample buffer 210 required 127 sample points during the ray tracing. In one embodiment, the rendering process stores up to the predicted number of samples for tracing a ray (up to 64 in our example). At the same time, the rendering process continues to render such a ray to determine how many samples are needed, without saving samples beyond the predicted maximum number. Only 64 samples are actually saved because storing additional samples would overwrite memory allocated to a different pixel in the bucket. The additional samples are represented by the dashed outline boxes. In this example, the sample count for pixel sample buffer 210 records 127 samples. This value is used in the adaptive subdivision process.

On returning from the rendering process, the rendering process determines whether any sample count for a pixel in the bucket exceeded the maximum. As shown in FIG. 2B, the maximum sample count returned is 127. Because this exceeds the maximum, (i.e., 64), the rendering component divides this bucket in half along a selected dimension. In one embodiment, the selected dimension alternates between an X (horizontal) and Y (vertical) subdivision to avoid thin or "slivered" sub-buckets. Of course, other schemes for diving a bucket into two (or more) sub-buckets may be used as well. For example, one well-known subdivision scheme in 2D is a split in four quadrants. The decision on how to split (2-ways, 4-ways, N-ways and where), can be made if more information of the required sample counts within a bucket is collected. If, for instance, samples counts are returned for every pixel, instead of the maximum of all pixels in a bucket.

In FIG. 2B, the X dimension is selected and each of the two sub-bucket sizes is now 128×256 pixels. Pixel sample buffer 214 and pixel sample buffer 216 represent two buffers in the sub-bucket after the memory has been allocated to each sub-bucket. Before being subdivided the allocated memory could contain a maximum of 64 samples per pixel. After the adaptive subdivision process, pixel sample buffers 214 and 216 show the maximum per pixel memory capacity is now 128 samples or double (2×64) the capacity of the original level bucket. The number of required samples (127) the pixel associated with pixel sample buffer 210 encountered will fit into the reallocated memory associated with pixel sample buffer 214.

When the rendering process for the sub-bucket returns, the rendering component compares the sample counts for the sub-bucket pixels to the new maximum number of samples value. If none of the sample counts exceed the new maximum number of samples in the sub-bucket, the rendering process finishes with the current sub-bucket and moves to the next sub-bucket where the rendering process is repeated. Should a sub-bucket rendering process return with a sample count greater than the estimated maximum number of samples in the sub-bucket, then the adaptive subdivision is repeated. The adaptive sub-division process continues until all the pixels in the original bucket render successfully. The rendering process then moves to the next top level bucket and the entire process is repeated until all the top level buckets have been successfully rendered. The final subdivision scheme for a particular bucket (i.e., a scheme of any bucket subdivisions that can be reused to render that same bucket, e.g., using different lighting parameters or object properties) is saved for interactive development of images.

Figure 3:
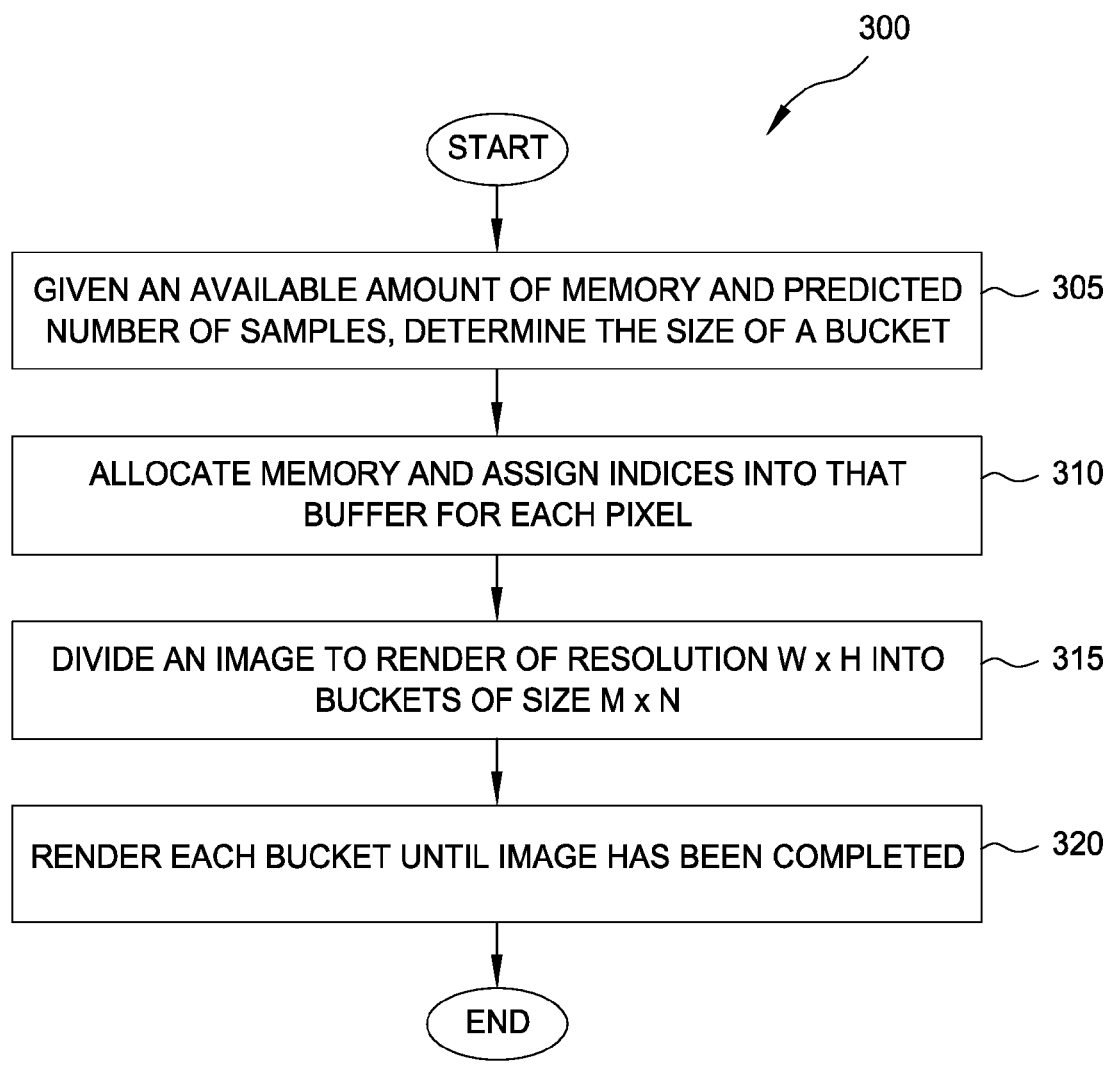
FIG. 3 illustrates a method for rendering a 3D volume using a set of buckets, according to one embodiment.

FIG. 3 illustrates a method for rendering a 3D volume using a set of buckets, according to one embodiment Although the method steps are described relative to FIGS. 1-2, and 4-7, persons skilled in the art will understand that any system configured to perform the method steps, in any order, falls within the scope of the present invention.

As shown, method 300 begins at step 305, where the rendering component determines the size of a bucket for rendering a 3D volume. In one embodiment, e.g., the bucket size is determined relative to an amount of memory available to the rendering pipeline and a predicted or estimated maximum number of samples needed to evaluate any given pixel. Doing so results in an M×N bucket corresponding to an M×N array of pixels. While not required, M and N may each be a power of 2, e.g., a bucket of 256×128 pixels or 256×256 pixels. For each pixel, the bucket generally corresponds to a portion of memory used to store rendering samples. At step 310, the rendering component allocates enough memory for the determined bucket size and assigns indices into the resulting memory buffer (i.e., the bucket) for each pixel. That is, the rendering component sets indices to the range of memory used to store samples for each pixel. Again, the amount of memory allocated to each bucket provides enough memory to collect samples used to render each pixel up to the predicted maximum number of samples. If a pixel requires more samples, such additional samples are generated (to allow for the number of samples actually required to be determined), but samples in excess of the maximum are not stored in the bucket. Instead, the bucket with a pixel requiring additional samples is divided into two sub-buckets, allocated memory, and re-rendered.

Figure 4:
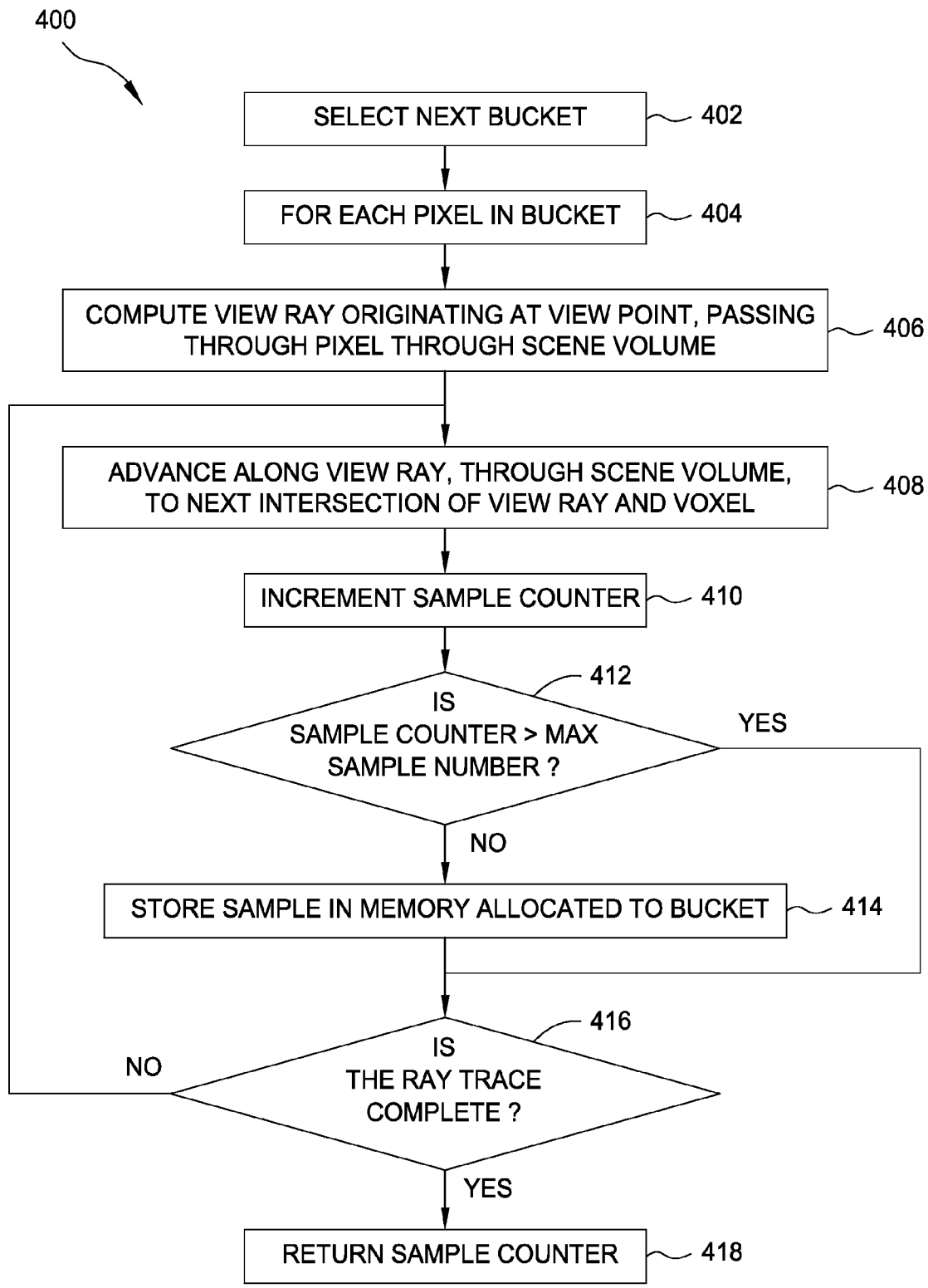
FIG. 4 illustrates a method for rendering a bucket using an adaptive bucket size and fixed memory allocation, according to one embodiment.

At step 315, an image of the 3D volume to be rendered is divided into buckets of size M×N as determined at step 305. At 320, the rendering component renders each bucket until the image is generated, as described in additional detail below. FIG. 4 illustrates a method for rendering a bucket using an adaptive bucket size and fixed memory allocation, according to one embodiment. Although the method steps are described relative to elements of FIGS. 1-3, and 5-7, persons skilled in the art will understand that any system configured to perform the method steps, in any order, falls within the scope of the present invention.

As shown, the method 400 begins at step 402, where the rendering component selects a bucket to render. The next bucket could be the first top level bucket or the next sub-bucket following a subdivision. At step 404, pixel data for the bucket is distributed on the GPU processors for parallel ray tracing process. At step 406, a view ray is computed for a pixel in the bucket selected at step 402. The origin for view ray generally corresponds to a position of a view camera. At step 408, sampling begins, e.g., where view ray enters scene volume. Note, however, the advancement of the view need not begin at the intersection with the next voxel, it can be earlier or later, depending on which marching algorithm is used. For example, in one embodiment, a data adaptive marching algorithm is used. Doing so allows the step size to change while marching depending on the complexity of the scene.

At each step, the sampling process increments the sample count as shown in step 410 and collects sample values used to render the pixel. At step 412, the sample count is compared to the maximum number of samples per ray. If the sample count is greater than the maximum sample number, the process does not store the sample values in memory but branches around the storage step and continues processing. If the sample count value is less than or equal to the estimated maximum sample number, at step 414 the sample values are stored in the array. At step 416, the ray tracing stops. If view ray exits the scene volume, then the ray trace for that view ray is complete and the sample count value is returned to the rendering component. If the view ray did not exit the scene volume, the ray trace is not complete and control returns to step 408.

Figure 5:
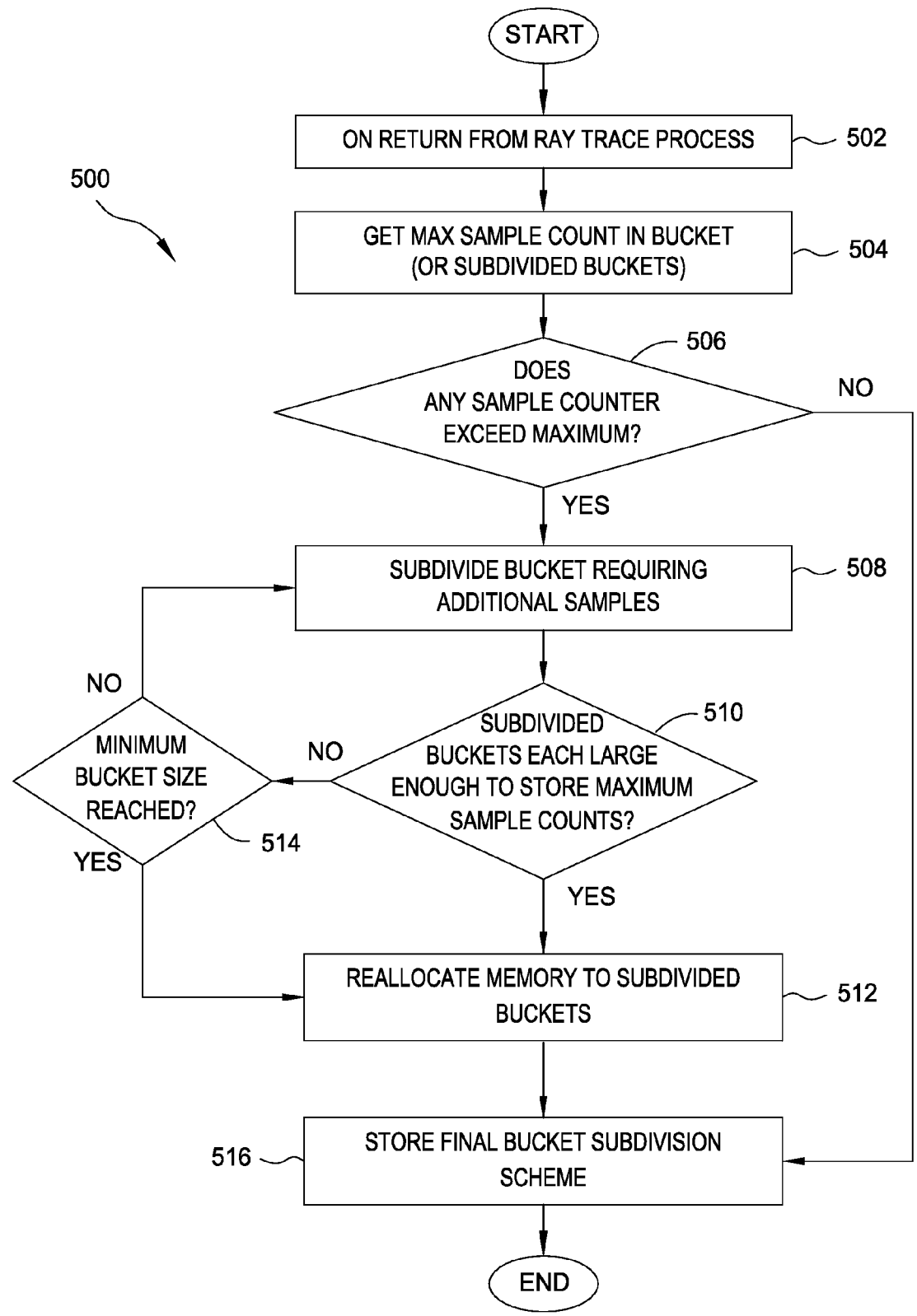
FIG. 5 illustrates a method for subdividing the bucket when the number of samples exceeds the allocated memory, according to one embodiment.

FIG. 5 illustrates a method for subdividing the bucket when the number of samples exceeds the allocated memory, according to one embodiment. Although the method steps are described relative to FIGS. 1-4, and 6-7, persons skilled in the art will understand that any system configured to perform the method steps, in any order, falls within the scope of the present invention.

As shown, method 500 begins at step 502, when the rendering component receives the return values from rendering pixels for one of the initial M×N buckets. At step 504, the rendering component determines a maximum sample count for the rendered bucket. That is, after obtaining 3D rendering samples for each pixel in the bucket, the rendering component determines the greatest sample count needed for any pixel in that bucket. If the maximum sample count exceeds the estimated maximum sample count (step 506), then at least one pixel did not have enough memory to store the rendering samples needed for that pixel. In such a case, a loop begins where the bucket is repeatedly subdivided until bucket sizes having capacity to store the samples needed for each pixel are reached (or alternatively, reaching a minimum bucket size).

At step 508, the bucket with at least one sample count exceeding the maximum is divided into two sub-buckets. As noted, bucket subdivision can be alternated between a horizontal and vertical subdivision. At step 510, the sample counts for the two subdivided buckets are evaluated. Dividing the bucket into two sub-buckets effectively doubles the number of samples that can be stored for each pixel (given memory allocated to a bucket being held constant). At step 510, the greatest sample count obtained for any pixel in each of the two sub-divided buckets is compared to an adjusted maximum sample count, e.g., 2× the previous maximum sample count. If the samples can be recorded in the two sub-buckets, then the subdividing stops and the method proceeds to step 512.

Otherwise, if one (or both) of the subdivided buckets still has a pixel with a recorded sample count that exceeds the adjusted maximum, then such bucket(s) may be subdivided again (repeating steps 506, 508, and 510). Before doing so, at step 514, the rendering component may test whether a minimum bucket size has been reached (e.g., 16×16 pixels). Until reaching this limit, the rendering component repeats steps 506, 508 and 510 until reaching a bucket size that can accommodate the largest needed sample count.

Once the subdivision process is complete, at step 512, memory is allocated to the subdivided buckets. Note, in one embodiment, this may occur by simply adjusting an indexing scheme into the one large memory buffer to account for the subdivisions. Additionally, the subdivided buckets may be appended to a list of not yet completed buckets to be rendered.

At step 514 the bucket and sub-bucket parameters are saved and the ray tracing process continues. This rendering component then selects a next bucket to process until all of the image is fully rendered.

Figure 6A:
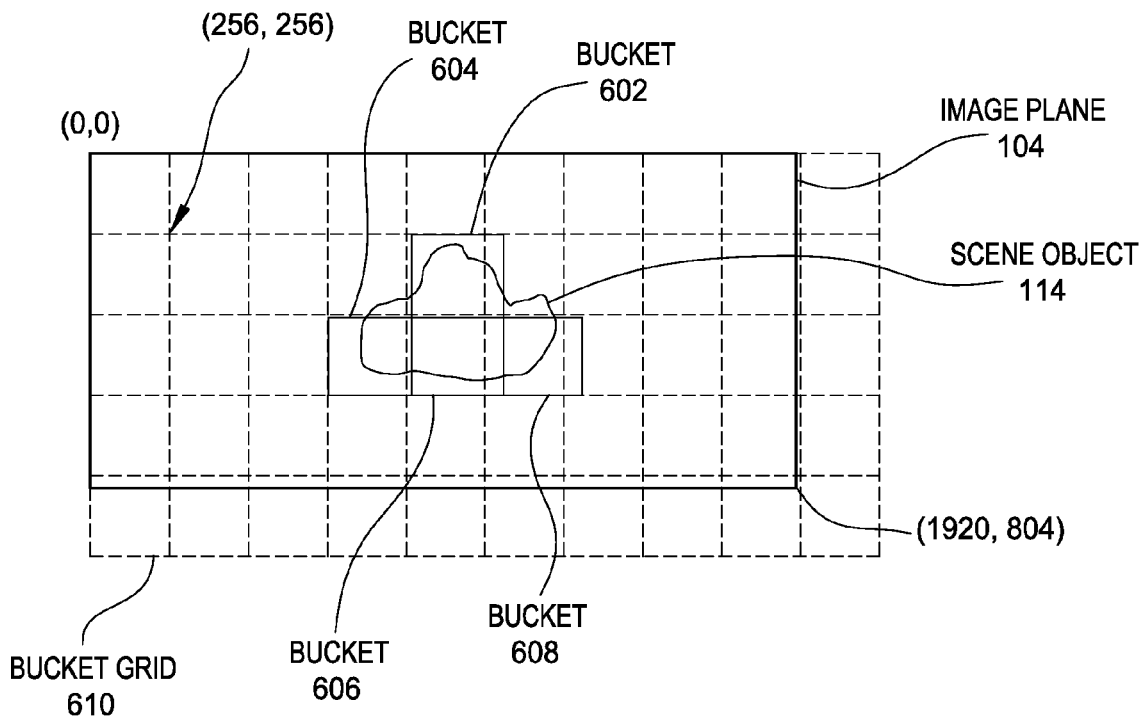
FIGS. 6A and 6B illustrate an example of buckets and sub-buckets during the adaptive subdivision process while rendering a 3D scene volume, according to one embodiment.
Figure 6B:
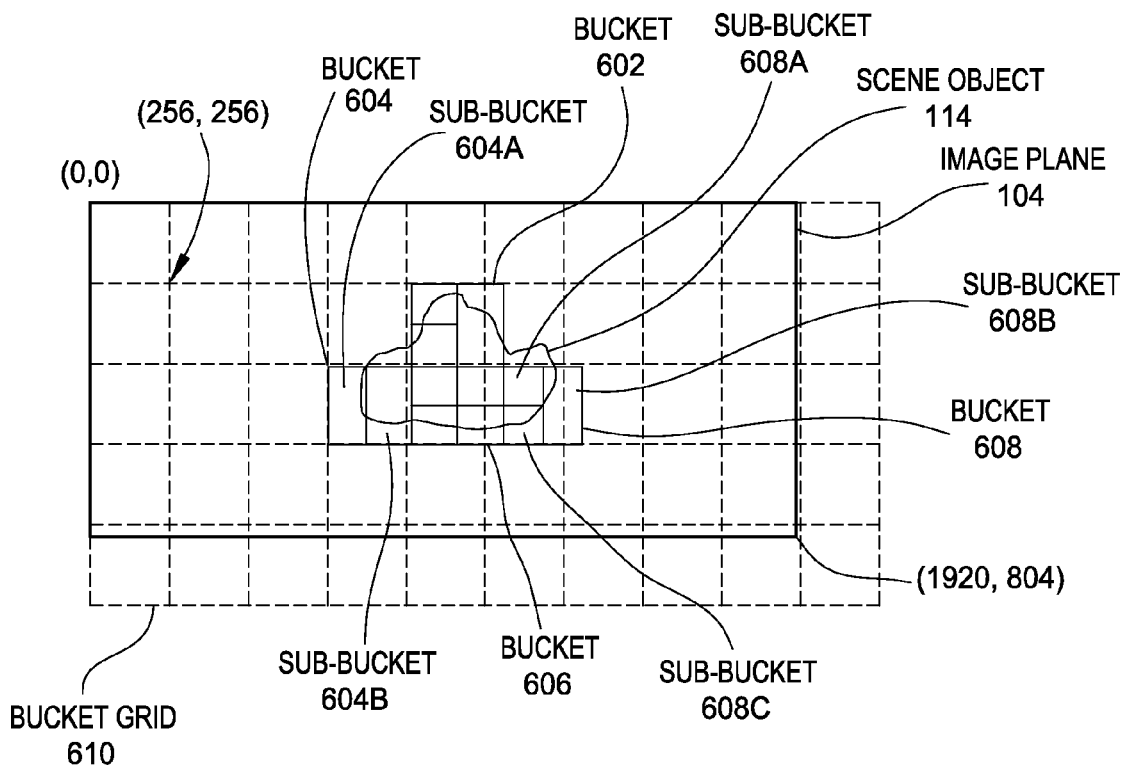

FIGS. 6A and 6B illustrate an example of buckets and sub-buckets during the adaptive subdivision process while rendering a 3D scene volume, according to one embodiment. As shown FIG. 6A includes image plane 104, scene object 114, buckets 602, 604, 606, 608, and bucket grid 610. Image plane 104 contains pixels assigned intensity values as a result of rendering. The rendering process is accelerated by using GPUs and by processing image plane pixels in buckets. Bucket grid 610 overlaid on image plane 104 is shown by the dotted lines. Each box in bucket grid 610 represents a 256 by 256 pixel bucket. The overall dimensions of image plane 104 in this example are 1920 by 804 pixels. In this example, scene object 114 is shown centered relative to image plane 104 and would therefore be rendered in the center of the output display. Buckets 602, 604, 606, and 608 illustrate buckets covering portions of scene object 114 and that could have more samples than the estimated maximum number of samples. Therefore buckets 602, 604, 606, and 608 represent candidate buckets for adaptive subdivision and memory reallocation during bucket rendering on the GPUs.

Referring to FIG. 6B, adaptive bucket subdivision results are shown for buckets 602, 604, 606, and 608. In addition to the elements in FIG. 6A, FIG. 6B includes sub-buckets 604A, sub-bucket 604B, sub-bucket 608A, sub-bucket 608B, and sub-bucket 608C. Bucket 604 was subdivided because the number of samples needed for bucket 604 exceeded the estimated maximum number of samples. After one bucket subdivision, the allocated memory was sufficient to contain the number of samples required to render the pixels in sub-bucket 604A and sub-bucket 604B. Also, the subdivision of bucket 604 into sub-bucket 604A and sub-bucket 604B was along the X dimension as shown by the vertical line dividing bucket 604. For reference, FIG. 2B (discussed earlier) depicts the memory allocation, generally, for the bucket subdivision of bucket 604.

The bucket subdivisions made to bucket 608 illustrate a situation which requires a second bucket subdivision. Bucket 608 is first subdivided as the number of samples required to render bucket 608 pixels exceeded the estimated maximum number of samples. The first subdivision is shown by the vertical line dividing bucket 608 in two, and the arrangement of the resulting sub-buckets would have been similar to sub-buckets 604A and 604B. However, one of the initial sub-buckets required further subdivision because the allocated memory was insufficient to contain the required number of samples. The second bucket subdivision is shown by the horizontal line dividing the sub-bucket and creating sub-bucket 608A and sub-bucket 608C. Sub-bucket 608B, one of the two original sub-buckets of bucket 608, did not require further subdivision. The memory allocated to sub-bucket 608B was sufficient to contain the required number of samples to render the pixels in sub-bucket 608B.

The result of both original sub-buckets requiring further subdivision is shown by bucket 606 in FIG. 6B. Bucket subdivision is repeated for each sub-bucket, alternating the direction from the containing bucket, or sub-bucket, until the allocated memory is sufficient to contain the required number of samples. The bucket subdivision parameters are saved after a bucket is successfully rendered. The bucket subdivision parameters can be reused during image development to rapidly re-render an image of a 3D volume. For example, the subdivision parameters saved for bucket 602 would contain the information to re-render bucket 602 using the bucket subdivision scheme that includes the second bucket subdivision for one sub-bucket. The bucket subdivision parameters saved for bucket 606 that contain the information to re-render bucket 606 but using the subdivision parameters, which specify the second subdivisions for both sub-buckets.

Figure 7:
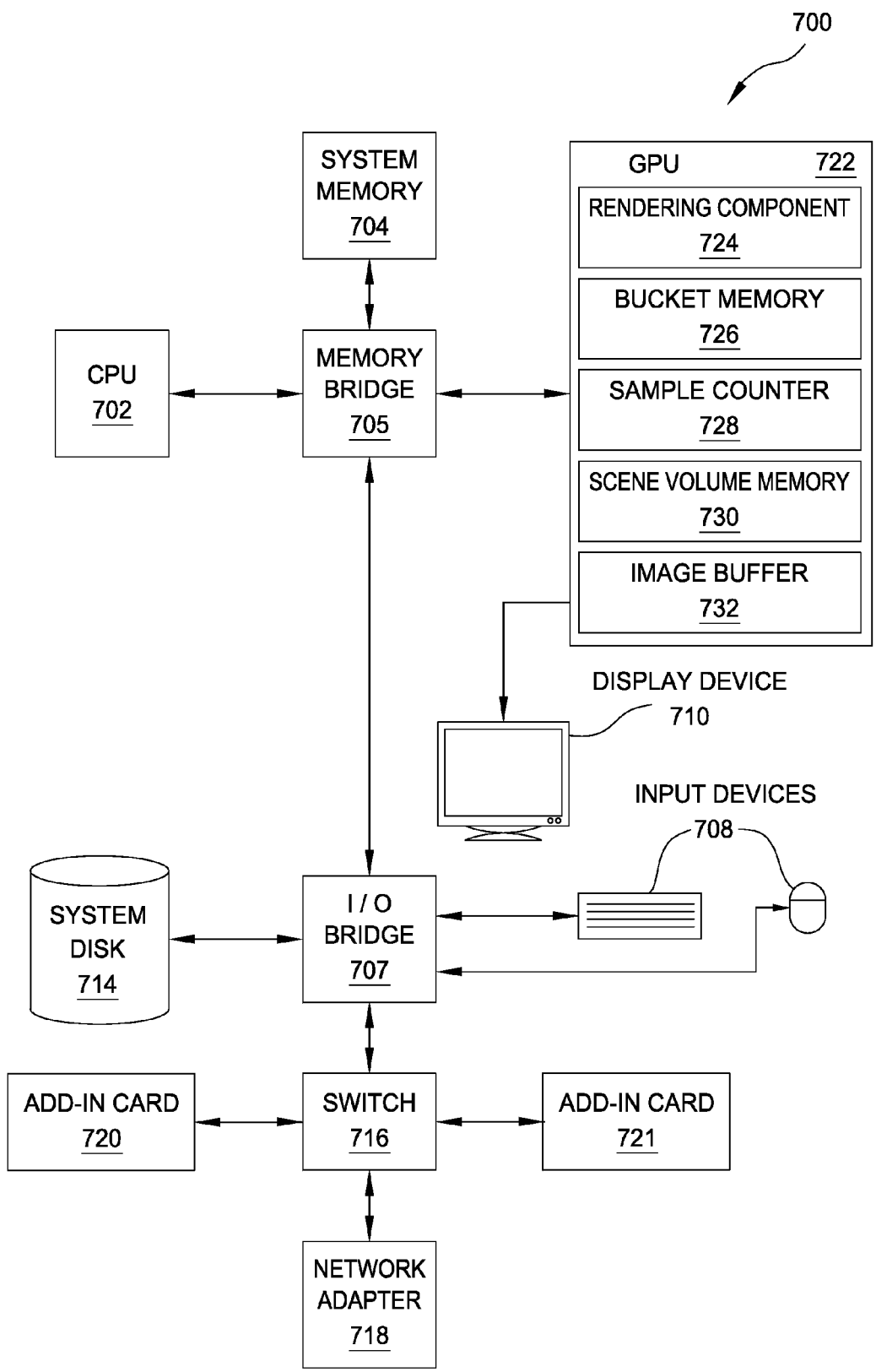
FIG. 7 illustrates an example computer system configured to carry out volume rendering and adaptive subdivision, according to one embodiment.

FIG. 7 illustrates an example computer system configured to carry out volume rendering and adaptive subdivision, according to one embodiment. System 700 may be a personal computer, video game console, personal digital assistant, rendering engine, or any other device suitable for practicing one or more embodiments of the present invention.

As shown, system 700 includes a central processing unit (CPU) 702 and a system memory 704 communicating via a bus path that may include a memory bridge 705. CPU 702 includes one or more processing cores, and, in operation, CPU 702 is the master processor of system 700, controlling and coordinating operations of other system components. System memory 704 stores software applications and data for use by CPU 702. CPU 702 runs software applications and optionally an operating system. Memory bridge 705, which may be, e.g., a Northbridge chip, is connected via a bus or other communication path (e.g., a HyperTransport link) to an I/O (input/output) bridge 707. I/O bridge 707, which may be, e.g., a Southbridge chip, receives user input from one or more user input devices 708 (e.g., keyboard, mouse, joystick, digitizer tablets, touch pads, touch screens, still or video cameras, motion sensors, and/or microphones) and forwards the input to CPU 702 via memory bridge 705.

Graphics processing units (GPU) 722 are coupled to memory bridge 705 via a bus or other communication path (e.g., a PCI Express, Accelerated Graphics Port, or Hyper-Transport link); in one embodiment GPU 722 includes at least one graphics processing unit (GPU) and graphics memory (not shown) supporting a display processing function. Graphics memory includes a display memory (e.g., image buffer 730 discussed below) used for storing pixel data for each pixel of an output image. Graphics memory can be integrated in the same device as the GPUs, connected as a separate device with the GPUs, and/or implemented within system memory 704.

As shown GPU 722, includes rendering component 724, bucket memory 726, sample count 728, scene volume memory 730, and image buffer 732. Rendering component 724, in operation, controls and coordinates rendering operations on GPU 722. Rendering component 724 manages adaptive bucket subdivision procedures, allocation and assignment of bucket memory 726, initializing sample count 728, and evaluating the values returned by sample count 728. GPU 722 also contains scene volume memory 730. Scene volume memory 730 is accessible by volume ray tracing processes and contains scene volume 114, scene object 110, light 106, and other relevant scene data, as described above. Scene volume memory 730 can be integrated in the same device as bucket memory 726, connected as a separate device with GPU 722, and/or implemented within system memory 704. Image buffer 732 is used for storing pixel data for each pixel of an output image that is generated by the volume ray tracing processes controlled by the rendering component 724.

GPU 722 periodically deliver pixels to display devices 710 (e.g., a screen or conventional CRT, plasma, organic light-emitting diode (OLED), surface-conduction electron-emitter display (SED), or liquid crystal display (LCD) based monitor or television). Additionally, GPU2 722 may output pixels to film recorders adapted to reproduce computer generated images on photographic film. GPU 722 can provide display devices 710 with an analog or digital signal.

A system disk 714 is also connected to I/O bridge 707 and may be configured to store content and applications and data for use by CPU 702 and GPU 722. System disk 714 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 716 provides connections between I/O bridge 707 and other components such as a network adapter 718 and various add-in cards 720 and 721. Network adapter 718 allows system 700 to communicate with other systems via an electronic communications network, and may include wired or wireless communication over local area networks and wide area networks such as the Internet.

Other components (not shown), including universal serial bus (USB) or other port connections, film recording devices, and the like, may also be connected to I/O bridge 707. For example, an audio processor may be used to generate analog or digital audio output from instructions and/or data provided by CPU 702, system memory 704, or system disk 714. Communication paths interconnecting the various components in FIG. 7 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, GPU 722 incorporates circuitry optimized for graphics and video processing, including, for example, video output circuitry, and constitutes a graphics processing unit (GPU). In another embodiment, GPUs 722 incorporates circuitry optimized for general purpose processing. In yet another embodiment, GPU 722 may be integrated with one or more other system elements, such as the memory bridge 705, CPU 702, and I/O bridge 707 to form a system on chip (SoC). In still further embodiments, GPU 722 is omitted and software executed by CPU 702 performs the functions of GPU 722.

Pixel data can be provided to GPU 722 directly from CPU 702. In some embodiments of the present invention, instructions and/or data representing a scene are provided to a render farm or a set of server computers, each similar to system 700, via network adapter 718 or system disk 714. The render farm generates one or more rendered images of the scene using the provided instructions and/or data. These rendered images may be stored on computer-readable media in a digital format and optionally returned to system 700 for display. Similarly, stereo image pairs processed by GPU 722 may be output to other systems for display, stored in system disk 714, or stored on computer-readable media in a digital format.

Alternatively, CPU 702 provides GPU 722 with data and/or instructions defining the desired output images, from which GPU 722 generates the pixel data of one or more output images, including characterizing and/or adjusting the offset between stereo image pairs, in the case of stereoscopic images. The data and/or instructions defining the desired output images can be stored in system memory 704 or graphics memory within GPU2 722. For example, CPU 702 could execute a client media player application (not shown) that receives a media stream from a content provider, and transmits the media stream to the GPU 722 for viewing on the display device 710. In an embodiment, GPU 722 includes 3D rendering capabilities for generating pixel data for output images from instructions and data defining the geometry, lighting shading, texturing, motion, and/or camera parameters for a scene. GPU 722 can further include one or more programmable execution units capable of executing shader programs, tone mapping programs, and the like.

CPU 702, render farm, and/or GPU 722 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 704 is connected to CPU 702 directly rather than through a bridge, and other devices communicate with system memory 704 via memory bridge 705 and CPU 702. In other alternative topologies GPU 722 is connected to I/O bridge 707 or directly to CPU 702, rather than to memory bridge 705. In still other embodiments, I/O bridge 707 and memory bridge 705 might be integrated into a single chip. The particular components shown herein are optional; for instance, any number of add-in cards or peripheral devices might be supported. In some embodiments, switch 716 is eliminated, and network adapter 718 and add-in cards 720, 721 connect directly to I/O bridge 707.

In one embodiment, a scene volume and lighting sources are created. After the scene volume dimensions are established, the scene volume is divided into volume elements (voxels). A view position and view direction are defined and an image plane, situated along the view direction between the view position and the scene volume, is established based on parameters that include the pixel resolution of the display. The pixels in an image plane are initially grouped into M×N arrays—referred to above as buckets. The initial grouping of the image plane pixels into buckets generates the top level buckets. An estimate of the number of samples needed to render each pixel in the bucket, along with the bucket size, is used to determine an amount of memory to allocate to render the buckets. For example, assume a value of 256 for M with the number of samples set to 64. The total GPU memory assigned to a bucket is computed based on the bucket size, M, and the estimated number of samples. The rendering component then allocates GPU memory to store samples for pixels in the buckets.

The GPU process each bucket by obtaining rendering samples for each pixel in each given bucket. To do so, pixel view rays may be traced from the view position, through the pixel, and on through the scene volume. Rendering samples are obtained along the view ray. After the all pixel samples needed for a each pixel are computed, the rendering component determines a maximum number of samples needed for any pixel in that bucket. If no pixel ray sample count exceeds this maximum, the rendering component advances to the next bucket and repeats the pixel ray processing.

If, however, the rendering component determines that at least one pixel required more samples than allocated, the bucket containing that pixel subdivided. In one embodiment, the bucket is divided in half along a vertical or horizontal dimension in an alternating manner. For example, if the top level bucket is 256×256 pixels, and the division is in the X dimension, the resulting sub-bucket dimensions are each 128×256 pixels. The sample counts for the subdivided buckets are then evaluated. Because the bucket now stores samples for one-half of the original number of pixels, the number of samples per pixel is effectively doubled (at least using a scheme that divides each bucket in two equally). If the sample count still exceeds this greater sample count, the bucket is divided again. This process generally repeats until reaching a bucket size with an adequate number of samples or reaching a minimum bucket size. Any subdivided buckets are then added to a list of buckets remaining to be rendered. This rendering process is used to process each of the initial M×N buckets. The final determination of the subdivisions is stored for reuse during interactive image development. Rendering the entire image stops when all the top level buckets have been successfully rendered.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, "software as a service" (SaaS), and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., volume renderers) or related data available in the cloud. For example, volume rendering using adaptive buckets could execute on a computing system in the cloud and render images by adaptively subdividing pixel regions. In such a case, the volume rendering using adaptive bucket could render images by adaptively subdividing pixel regions and store the processed pixels as well as the subdivision scheme for the image at a storage location in the cloud. Doing so allows a user to access this information from any computing system attached to a network connected to the cloud (e.g., the Internet).

Advantageously, subdividing buckets when the memory allocated for pixel samples is insufficient, is more efficient, as well as providing a solution to the problem presented by current GPUs that do not allow dynamic memory allocation during the rendering process. The absence of dynamic memory allocation can create situations in which the number of pixels that can be rendered at any one time and with enough memory to assure the collection of the maximum number of deep samples in the scene must be determined through trial and error or large amounts of memory must be allocated very inefficiently. In either case the number of unproductive rendering iterations increases and even more so during interactive image development. Adaptive bucket subdivision allows image rendering to proceed using estimated values for bucket size and the number of samples expected for each bucket pixel. When the estimates are wrong, the portion of the scene generating the problem can be "isolated" and resources "focused" on the problem area by reducing the bucket size and concomitantly increasing the available memory to the sub-bucket. Larger areas that do not exceed the estimates will be processed faster by taking full advantage of the parallel nature of volume ray tracing. Adaptive bucket subdivision obviates the need for re-rendering large areas of the image or possibly the entire image in situations where the required number of samples exceeds the estimated maximum number of samples. The subdivision scheme for an image may be saved for reuse in rendering the image during interactive development of the image or saved to better determine estimates of the maximum sample numbers for buckets.

While the foregoing is directed to embodiments of the present invention, other and further embodiments of the invention may be devised without departing from the basic scope thereof, and the scope thereof is determined by the claims that follow.

What is claimed is:

1. A computer-implemented method for rendering an image of a three-dimensional (3D) volume, the method comprising:
   dividing pixels of an image plane, through which rays are traced into a scene including the 3D volume, into a set of buckets to be rendered, wherein each bucket includes a two-dimensional (2D) array of pixels of the image plane and wherein each bucket is allocated a portion of memory for storing rendering samples for pixels in the 2D array corresponding to the bucket;
   determining, for each of the buckets including 2D arrays of pixels of the image plane through which the rays are traced, a sample count value specifying a maximum number of rendering samples for each of the pixels of the 2D array to be stored in the portion of memory allocated to the bucket, the rendering samples for each of the pixels being computed at points along a ray corresponding to the pixel as the ray is traced through the 3D volume; and
   processing the set of buckets to generate an image of the 3D volume, wherein processing the set of buckets includes:
      selecting a bucket from the set of buckets,
      generating a plurality of rendering samples used to determine a pixel value for each pixel in the 2D array of pixels of the image plane corresponding to the selected bucket, the rendering samples for each pixel being computed at points along the ray corresponding to the pixel as the ray is traced through the 3D volume,
      storing, for each pixel in the selected bucket, the generated plurality of rendering samples for the pixel, up to the maximum number of rendering samples specified by the sample count value determined for the selected bucket,
      in response to determining that a number of rendering samples generated for at least one pixel in the selected bucket at points along one or more rays corresponding to the at least one pixel as the one or more rays are traced through the 3D volume exceeds the sample count value determined for the selected bucket, dividing the selected bucket into at least two sub-buckets, wherein each of the sub-buckets is allocated a portion of memory for storing rendering samples for pixels in a 2D array of pixels of the image plane corresponding to the sub-bucket, and wherein, for each of the sub-buckets, a sample count value determined for the sub-bucket and specifying a maximum number of rendering samples for each of the pixels of the 2D array corresponding to the sub-bucket to be stored in the portion of memory allocated to the sub-bucket is greater than the sample count value determined for the selected bucket, and
      adding the at least two sub-buckets to the set of buckets for processing.

2. The method of claim 1, wherein each of the plurality of buckets, including the sub-buckets, is allocated a fixed amount of memory based on the corresponding sample count value specifying the maximum number of rendering samples to be stored in the portion of memory allocated to the bucket.

3. The method of claim 1, wherein the sample count value for each of the buckets specifying the corresponding maximum number of rendering samples is determined based on an estimated number of samples needed to render the pixels of the image plane.

4. The method of claim 1, further comprising, storing a subdivision scheme indicating subdivisions made to the plurality of buckets.

5. The method of claim 1, wherein each subdivision into sub-buckets doubles the maximum number of samples that can be stored, per pixel, in portions of memory allocated to the sub-buckets.

6. The method of claim 1, wherein dividing the bucket into the at least two sub-buckets comprises, dividing the bucket along a selected horizontal or vertical dimension.

7. The method of claim 6, wherein the selected dimension alternates between the horizontal and vertical dimensions with each subdivision.

8. The method of claim 1, wherein generating the plurality of rendering samples used to determine the pixel value for each pixel in the 2D array corresponding to the selected bucket comprises:
   tracing the ray corresponding to the pixel through the 3D volume; and
   computing a sample count for each pixel at a plurality of sample points along the ray corresponding to the pixel.

9. A non-transitory computer-readable storage medium storing one or more application programs, which, when executed on a processor, perform an operation for rendering an image of a three-dimensional (3D) volume, the operation comprising:
   dividing pixels of an image plane, through which rays are traced into a scene including the 3D volume, into a set of buckets to be rendered, wherein each bucket includes a two-dimensional (2D) array of pixels of the image plane and wherein each bucket is allocated a portion of memory for storing rendering samples for pixels in the 2D array corresponding to the bucket;

determining, for each of the buckets including 2D arrays of pixels of the image plane through which the rays are traced, a sample count value specifying a maximum number of rendering samples for each of the pixels of the 2D array to be stored in the portion of memory allocated to the bucket, the rendering samples for each of the pixels being computed at points along a ray corresponding to the pixel as the ray is traced through the 3D volume; and processing the set of buckets to generate an image of the 3D volume, wherein processing the set of buckets includes:

selecting a bucket from the set of buckets, generating a plurality of rendering samples used to determine a pixel value for each pixel in the 2D array of pixels of the image plane corresponding to the selected bucket, the rendering samples for each pixel being computed at points along the ray corresponding to the pixel as the ray is traced through the 3D volume, storing, for each pixel in the selected bucket, the generated plurality of rendering samples for the pixel, up to the maximum number of rendering samples specified by the sample count value determined for the selected bucket, in response to determining that a number of rendering samples generated for at least one pixel in the selected bucket at points along one or more rays corresponding to the at least one pixel as the one or more rays are traced through the 3D volume exceeds the sample count value determined for the selected bucket, dividing the selected bucket into at least two sub-buckets, wherein each of the sub-buckets is allocated a portion of memory for storing rendering samples for pixels in a 2D array of pixels of the image plane corresponding to the sub-bucket, and wherein, for each of the sub-buckets, a sample count value determined for the sub-bucket and specifying a maximum number of rendering samples for each of the pixels of the 2D array corresponding to the sub-bucket to be stored in the portion of memory allocated to the sub-bucket is greater than the sample count value determined for the selected bucket, and adding the at least two sub-buckets to the set of buckets for processing.

10. The computer-readable storage medium of claim 9, wherein each of the plurality of buckets, including the sub-buckets, is allocated a fixed amount of memory based on the corresponding sample count value specifying the maximum number of rendering samples to be stored in the portion of memory allocated to the bucket.

11. The computer-readable storage medium of claim 9, wherein the sample count value for each of the buckets specifying the corresponding maximum number of rendering samples is determined based on an estimated number of samples needed to render the pixels of the image plane.

12. The computer-readable storage medium of claim 9, wherein the operation further comprises, storing a subdivision scheme indicating subdivisions made to the plurality of buckets.

13. The computer-readable storage medium of claim 9, wherein each subdivision into sub-buckets doubles the maximum number of samples that can be stored, per pixel, in portions of memory allocated to the sub-buckets.

14. The computer-readable storage medium of claim 9, wherein dividing the bucket into the at least two sub-buckets comprises, dividing the bucket along a selected horizontal or vertical dimension.

15. The computer-readable storage medium of claim 14, wherein the selected dimension alternates between the horizontal and vertical dimensions with each subdivision.

16. The computer-readable storage medium of claim 9, wherein generating the plurality of rendering samples used to determine a pixel value for each pixel in the 2D array corresponding to the selected bucket comprises:

tracing the ray corresponding to the pixel through the 3D volume; and computing a sample count for each pixel at a plurality of sample points along the ray corresponding to the pixel.

17. A system, comprising:

a processor; and a memory storing one or more application programs, which, when executed on the processor, perform an operation for rendering an image of a three-dimensional (3D) volume, the operation comprising:

dividing pixels of an image plane, through which rays are traced into a scene including the 3D volume, into a set of buckets to be rendered, wherein each bucket includes a two-dimensional (2D) array of pixels of the image plane and wherein each bucket is allocated a portion of memory for storing rendering samples for pixels in the 2D array corresponding to the bucket, determining, for each of the buckets including 2D arrays of pixels of the image plane through which the rays are traced, a sample count value specifying a maximum number of rendering samples for each of the pixels of the 2D array to be stored in the portion of memory allocated to the bucket, the rendering samples for each of the pixels being computed at points along a ray corresponding to the pixel as the ray is traced through the 3D volume, and processing the set of buckets to generate an image of the 3D volume, wherein processing the set of buckets includes:

selecting a bucket from the set of buckets;

generating a plurality of rendering samples used to determine a pixel value for each pixel in the 2D array of pixels of the image plane corresponding to the selected bucket, the rendering samples for each pixel being computed at points along the ray corresponding to the pixel as the ray is traced through the 3D volume;

storing, for each pixel in the selected bucket, the generated plurality of rendering samples for the pixel, up to the maximum number of rendering samples specified by the sample count value determined for the selected bucket;

in response to determining that a number of rendering samples generated for at least one pixel in the selected bucket at points along one or more rays corresponding to the at least one pixel as the one or more rays are traced through the 3D volume exceeds the sample count value determined for the selected bucket, dividing the selected bucket into at least two sub-buckets, wherein each of the sub-buckets is allocated a portion of memory for storing rendering samples for pixels in a 2D array of pixels of the image plane corresponding to the sub-bucket, and wherein, for each of the sub-buckets, a sample count value determined for the sub-bucket and specifying a maximum number of rendering samples for each of the pixels of the 2D array corresponding to the sub-bucket to be stored in the portion of memory allocated to the sub-bucket is greater than the sample count value determined for the selected bucket; and adding the at least two sub-buckets to the set of buckets for processing.

18. The system of claim 17, wherein each of the plurality of buckets, including the sub-buckets, is allocated a fixed amount of memory based on the corresponding sample count value specifying the maximum number of rendering samples to be stored in the portion of memory allocated to the bucket.

19. The system of claim 17, wherein the sample count value for each of the buckets specifying the corresponding maximum number of rendering samples is determined based on an estimated number of samples needed to render the pixels of the image plane.

20. The system of claim 17, further comprising, storing a subdivision scheme indicating subdivisions made to the plurality of buckets.

21. The system of claim 17, wherein each subdivision into sub-buckets doubles the maximum number of samples that can be stored, per pixel, in portions of memory allocated to the sub-buckets.

22. The system of claim 17, wherein dividing the bucket into the at least two sub-buckets comprises, dividing the bucket along a selected horizontal or vertical dimension.

23. The system of claim 22, wherein the selected dimension alternates between the horizontal and vertical dimensions with each subdivision.

24. The system of claim 17, wherein generating the plurality of rendering samples used to determine a pixel value for each pixel in the 2D array corresponding to the selected bucket comprises:

tracing the ray corresponding to the pixel through the 3D volume; and computing a sample count for each pixel at a plurality of sample points along the ray corresponding to the pixel.

25. A method for rendering at least a portion of an image, through which rays are traced into a scene including a three dimensional (3D) volume, the method comprising:

for each pixel in the portion of the image through which the rays are traced:

generating one or more samples of the 3D volume used to determine a pixel value for the pixel, the samples being computed at points along a ray corresponding to the pixel as the ray is traced through the 3D volume, and storing, up to a per-pixel maximum, the samples generated for the pixel in a memory array;

counting the number of samples generated for the pixel, wherein any samples beyond the per-pixel maximum are counted for determining a subdivision of the portion of the image but are not stored in the memory array; and in response to determining the count of samples generated for one or more of the pixels in the portion of the image at points along one or more rays corresponding to the one or more pixels as the one or more rays are traced through the 3D volume exceeds the per-pixel maximum, repeatedly subdividing the portion of the image into at least two portions until the memory array can store the counted number of samples for the one or more pixels in one of the at least two subdivided portions of the image.

26. The method of claim 25, wherein repeatedly subdividing the portion of the image into at least two portions comprises alternating between dividing along a horizontal dimension and vertical dimension.

27. The method of claim 25, wherein the per-pixel maximum is determined based on an estimated number of samples needed to render pixels in the image.

28. The method of claim 25, wherein the portion of the image is subdivided up to a minimum image portion size.

* * * * *